3,360,337
INDICATOR TAPE
Martin I. Edenbaum, Somerset, and Merle I. Hampton, Highland Park, N.J., assignors to Johnson & Johnson, a corporation of New Jersey
No Drawing. Filed Dec. 24, 1964, Ser. No. 421,078
7 Claims. (Cl. 23—253)

ABSTRACT OF THE DISCLOSURE

An ink solution is disclosed which consists of a solution of zinc sulfide and lead chloride and a film forming carrier, preferably vinyl chloride, in an organic solvent, suitably methyl isobutyl ketone. The zinc sulfide and lead chloride are present in an amount of at least 3 parts by weight of equal molar equivalents of the same for each part by weight of film forming carrier. The ink is utilized to form white markings on various substrates by evaporating the organic solvent, markings which become black in color when exposed to a moist atmosphere and a temperature of 250° F. for 30 minutes. The ink is therefore particularly adapted for use as or on a device to be attached to articles which are to be steam sterilized, the device indicating whether or not steam sterilization has in fact occurred.

---

The present invention relates to color change indicators and more particularly to color change indicators which effect a color change under sterilization conditions of high temperature and humidity effected during steam sterilization.

In hospitals, clinics and the like, it is standard practice to sterilize various products such as gowns, drapes, sheets, dressings, and other articles, prior to use by placing them in an autoclave where they are subjected to steam sterilization. This practice is necessary to avoid infection and prevent contamination from the use of such articles where the same are not in a sterile condition and is particularly important where the articles have previously been used in the care of other patients. As there is no visual way of determining whether a particular article is sterile or not, it has been the practice to use, with the article when placed in the steam sterilization chamber, a color change indicator which changes color under the sterilizing conditions of the autoclave, thus indicating that the particular article or package has been passed through the sterilizing cycle. The indicator may be in the form of a ribbon or card to which a color change ink has been applied.

It is generally the practice in sterilizing such articles to gather several articles together, bundling the same in a porous wrap, and then the package, held together by tying with string or by pressure-sensitive adhesive tape, is placed in an autoclave together with a sterilization indicator. The sterilization indicator may be either inserted in or applied to the package. Where pressure-sensitive adhesive tapes are used for this purpose, it is convenient to have the color change indicator on the tape backing. The visible back of the tape holding the package together then indicates whether or not the same has been passed through the sterilization cycle by virtue of its color change. Pressure-sensitive adhesive tapes of this type are, for example, described in U.S. Patent No. 2,889,799.

One of the most commonly used color change markings for this purpose are markings containing sulphur and lead oxide. The sulphur in the presence of the lead oxide, under the conditions of steam sterilization, changes from a yellow to a black color as it is converted to lead sulfide. It has been the practice to mix the sulphur and the lead oxide together in equivalent molar proportions in an ink base which is then applied to an indicator card or to the back of a pressure-sensitive adhesive tape, which, in turn, is then associated with the articles to be sterilized. If the autoclave or other steam sterilizing equipment used is not functioning, or if the package to be sterilized inadvertently gets omitted from being placed in the autoclave, this can readily be determined by the fact that no reaction has occurred between the sulphur and the lead oxide as shown by the lack of color change in the indicator.

Although giving a good color change from a light yellow to a deep black with fresh inks, the color change indicator markings made from the active ingredients, lead oxide and sulphur, tend to lose much of their sensitivity over extended periods of storage. This is particularly true under relatively hot or humid conditions. As a result, the ink markings tend to darken appreciably in storage. Also, markings do not turn to the same deep black on being subjected to sterilizing conditions but tend to assume a dark gray appearance with the result that the color change is not nearly as marked as with fresh inks. Another difficulty with inks made using sulphur as one of the active ingredients is that the sulphur tends to stain when it comes in contact with many of the new mercurial rinses, such for example as phenylmercuric propionate a material sold under the trade name Velva Soft-G and presently used in many hospitals as a bactericide. This results in the staining of sheets and other articles making the same somewhat unsightly. The sulphur in the ink also tends to sublime during storage, thus removing part of the sulphur content and further reducing the effectiveness of the ink as a color change indicator. Another difficulty with the conventional sulphur lead oxide color change inks is that they are relatively unstable, necessitating the practice of forming separate solutions of the sulphur and the lead oxide and then combining the two together just prior to using the ink for marking. This is apparently due to the fact that the sulphur and lead oxide tend to react while in the solvent medium used in forming the ink. If the ink solution is prepared several days prior to its use, a substantial reduction in color change sensitivity results.

Where the color change indicator is to be used in combination with a pressure-sensitive adhesive tape, as by printing the ink on the back of the tape, the inks containing the sulphur have the further disadvantage that the sulphur in the marking tends to migrate into the pressure-sensitive adhesive where the tape is wound on itself in roll form, thus further reducing the sensitivity of the marking to color change when the tape, with the ink marking thereon, is later exposed to steam sterilization conditions.

Despite these inherent disadvantages in color change markings using sulphur and lead oxide, such markings have continued to be used as steam sterilization indicators as they were still superior to other known color change indicators for indicating steam sterilization.

It is an object of the present invention to make color change indicators which will give a marked color change under steam sterilizing conditions and which are stable over extended periods of storage under normal atmospheric conditions. It is a further object of the present invention to make color change indicators which change from a light color to a deep black only when subjected to steam under conditions that will give effective sterilization. It is a still further object of the present invention to prepare inks in which the color change pigments are stable for extended periods of time while still in the liquid ink medium, and from which markings can be made which are stable to color change under normal atmospheric conditions. It is still a further object of the present invention to prepare color change markings free from the deficiencies previously mentioned which are present in color change markings in which free sulphur and lead oxide are the primary active ingredients. Other objects and advantages of this invention will become apparent from the following description wherein are set forth by way of illustration and example certain embodiments thereof.

It has now been discovered that excellent color change markings can be made by having in the marking an intimate mixture of zinc sulfide and lead chloride as the active color change ingredients.

It has been found that zinc sulfide and lead chloride, when used in the proper concentrations in a marking ink without other pigment and in the proper ratios, will give a marking which is white. However, when heated in the presence of steam to a temperature of about 250° F. for a period of about 30 minutes the ink marking turns to a deep black color. Although showing excellent stability under normal atmospheric conditions and under dry heat conditions even at temperatures as high as 300° F., when heated for half an hour in a steam atmosphere at 250° F., a sharp color change occurs from the basic white of the mixed reactants to a deep, solid black.

The color change ingredients, zinc sulfide and lead chloride, are applied in an ink base containing a film forming carrier for anchoring the color change pigments to a substrate after the solvent medium used in the ink has evaporated. Any flexible film-forming resin sufficiently permeable to moisture under steam sterilizing conditions to permit the color change may be used. Vinyl base resin film-forming compositions are a good example of film-forming compositions of this type copolymers of polyvinyl chloride and polyvinyl acetate vinyl resins such, for example, as those sold under the trade name Bakelite Resin VYHH, have been found to be particularly suitable. The concentration in the ink of active color change pigment is somewhat critical with respect to the amount of film-forming resin used. It is found that there should be at least about three parts by weight of active color change pigment for each part by weight of the vinyl resin carrier or film former used. Any amount in excess of 3 parts by weight of active color change pigment may be used without deleteriously affecting the color change. However, there must be sufficient of the carrier to bond the color change pigment to the base to which it is applied. In the preferred practice, the active color change pigment is present in amounts of about 3 to 8 parts by weight per part by weight of the resin carrier. By active color change pigment is meant equal molar equivalents of zinc sulfide and lead chloride (about 3 parts by weight lead chloride for each part by weight zinc sulfide) to react to give the color change which results from the reaction of zinc sulfide and lead chloride to form lead sulfide and zinc chloride. Although the concentration of active color change pigment with respect to the amount of resin film former used is somewhat critical in that there must be at least about three parts by weight of active color change pigment for each part by weight of the film former, there is no particular criticality as to the proportion of the zinc sulfide to lead chloride, other than that needed to give the required amount of active color change pigment.

It is generally preferred, however, to have these chemicals present in the proportions of about 3 parts by weight lead chloride to one part by weight of the zinc sulfide. Although the reaction is believed to take place on an equal molar equivalent basis, surprisingly there is no apparent decrease in the deepness of the black with substantial excess of lead chloride even with amounts as great as 16 parts lead chloride for each one part zinc sulfide. However, excess amounts of zinc sulfide over the molar equivalent of lead chloride needed to give the above reaction tend to reduce the blackness of the final color change, and with substantial amounts of zinc sulfide in excess a gray color is obtained.

Any solvent may be used for the resin film-forming carrier in making up the ink solution. Methyl isobutyl ketone, hereinafter referred to as MIBK, is an excellent solvent for this purpose particularly where the film-forming resin carrier is a vinyl resin, such as Bakelite Resin VYHH.

The film-forming resin carrier used must be one which is permeable to steam in order to obtain a satisfactory color change under steam sterilizing conditions. Where the resin film-forming carrier does not of itself have sufficient permeability to steam, it can be made satisfactorily permeable by adding to the ink a small amount of wetting agent of either the anionic or cationic type. Non-ionic wetting agents do not appear to be satisfactory for this purpose.

With certain combinations of backsize, ink vehicle and release coatings, the color reaction in a steam autoclave of the zinc sulfide-lead chloride ink has been found to be erratic and not dark enough. In these cases, it is possible to enhance the color reaction, to obtain a good solid black color after steam sterilization, by incorporating a small amount of an acid or basic salt in the ink. This same enhancement of color change can be obtained by incorporating an acidic or basic material in the tape backing or release coating. Ammonium sulfate is found to be an excellent additive for this purpose, and in the preferred practice a small amount is included in the ink.

One of the substantial advantages of the color change inks of the present invention is that, in order to get a good color change, it is necessary to heat the ink markings at a temperature of about 250° F., or higher, for about 30 minutes. If heated, for example, only to 215° F. for 30 minutes, only a muddy color results.

As autoclave temperatures sometimes drop substantially below 250° F., with the result that articles autoclaved are not properly sterilized, this feature of the present inks provides a means of checking the efficiency of the autoclave, or other steam sterilizing apparatus, besides assuring that the articles so marked have been subjected to proper sterilizing conditions. One of the difficulties with many color change indicators used prior to the present invention was that they would give color changes when passed through autoclaves which were not operating at satisfactory sterilization conditions. The color change obtained thus indicated only that the article had been subjected to steam in the autoclave, but not that it had been subjected to conditions satisfactory for sterilizing purposes.

As the color change is from white to a deep black the is quite stable to dry heat, even at temperatures as high as 375° F., the color change inks are well suited for the preparation of temperature indicator tapes of the type described in Patent No. 2,889,799, where the pressure-sensitive adhesive of the tape is a heat cured pressure-sensitive adhesive. As curing temperatures for such pressure-sensitive adhesives are frequently as high as 300° F., any color change indicator not showing substantial stability under dry heat conditions at such temperature is not fully satisfactory, as a substantial amount of the sensitivity to color change of the ink is lost during the curing of the pressure-sensitive adhesives. The color change indicator inks of the present invention are thus particularly well suited for the preparation of temperature indicator pressure-sensitive adhesive tapes, wherein the color change indicator is carried by the tape.

As the color change is from white to a deep black the extreme change in color is readily identified and clearly points out to the user whether or not the sterilizing conditions have been met. Also, the initial white color is advantageous in case it is desired to use a colored ink as the marking, since any pigment added will show up in its true color, thus permitting the addition of pigments to give a light blue, light green, or any other preferred initial ink color.

The invention is further illustrated by the following examples which are given for the purposes of illustration only, the invention not being limited thereto.

Example I

A vehicle of the following formulation is prepared:

| | Parts |
|---|---|
| Bakelite Resin VYHH | 1.0 |
| MIBK (methyl isobutyl ketone solvent) | 2.75 |

The following compounds are ground into 100 parts of this vehicle on a three roll mill:

| | Parts |
|---|---|
| Zinc sulfide | 30 |
| Lead chloride | 90 |
| Inert green pigment (phthalocyanin green) | 0.5 |

The resulting paste is diluted with an equal weight of MIBK solvent to give an ink of proper viscosity for intaglio printing.

A small amount of a cationic wetting agent, and a small amount of ammonium sulfate are stirred into the diluted ink.

The ink so prepared is then rotogravure printed on a 30 lb. stock paper which has been surface coated with a white pigmented styrene-butadiene latex. The print roll used is engraved with a pattern of small diamonds arranged in straight rows running at an angle of 60° to the direction of travel of the paper.

In printing, the white coated paper is passed between the print roll and a hard rubber roll. The ink is transferred from the diamond pattern on the print roll, to the paper, by applying pressure between these two rolls. After passing between these two rolls, the ink is dried in an oven at a temperature of about 150° F.

The printed side of the paper is then top coated with a release coating of a heat curable film-former containing stearyl methacrylate as the release agent. This release coating is cured by heating at 300° F. for thirty seconds.

The reverse side of the paper is then coated with a heat curable pressure-sensitive adhesive. The adhesive coating is then cured by heating in the absence of moisture to 325° F. for one minute. The heat curable pressure-sensitive adhesive is a rubber base adhesive containing about 7 parts by weight phenol formaldehyde resin for each one hundred parts by weight crepe rubber, the adhesive being of the general type described in the previously referred to Patent No. 2,889,799. Rolls of the tape so prepared are aged at temperatures of 150° F., 120° F., 100° F. and 70° F. Results of storage are as follows:

(a) 150° F., 35% Relative Humidity for 6 Days (Navy Aging)

There is no discoloration of the ink or discoloration of the mass by reaction with the ink. Ink markings are identical to the markings of the tape before storage.

(b) 120° F., Dry heat for 8 weeks

Results are the same as in (a) above.

(c) 100° F., Dry heat for 8 weeks

Results are the same as in (a) above.

(d) 70° F., Dry heat for 8 weeks

Results are the same as in (a) above.

Aged samples are subjected to steam sterilization in an autoclave. The color developed after autoclaving in each case is just as good after the storage tests as is the color change on autoclaving prior to aging. In each case a deep black color is obtained. The inclusion of the small amount of the green pigment is so that the markings can be observed prior to sterilization, otherwise they cannot be seen on the white background.

A bag of 4″ x 4″ gauze sponges is wrapped once around with 80 x 72 count muslin impregnated with Velva Soft-G and the ends closed. A strip of the indicator paper, as prepared above, about 20 inches long is then wrapped once around the girth of the bundle overlapping itself for about 4 inches. In case of paper containing no adhesive, it is held to the bundle with a strip of adhesive tape. The bundle is then placed in a steam autoclave and autoclaved at 250° F. with saturated steam for 30 minutes. The bundle is removed from the autoclave chamber at the conclusion of the cycle.

The ink pattern is a distinct dark black color, which contrasts with the unprinted background areas which are unchanged in color. No discoloration of the Velva Soft-G impregnated muslin is observed.

The above test is repeated, except that a sterilizer cycle at 215° F. for 30 minutes is used. At these conditions, the ink markings change to a grey-green in color.

Example II

An ink of the following formulation is prepared:

| | Parts |
|---|---|
| Bakelite Resin VYHH | 20 |
| MIBK | 55 |
| Zinc sulfide | 9.4 |
| Lead chloride | 28.2 |

"parts" where used, referes to parts by weight.

This ink is drawn down with a #12 Mayer bar on bond paper and steam sterilized at 250° F. for thirty minutes. The original color of this ink is white. After steam sterilization it has turned a light grey.

An ink of the following formulation is prepared:

| | Parts |
|---|---|
| Bakelite resin VYHH | 20 |
| MIBK | 55 |
| Zinc sulfide | 19 |
| Lead chloride | 57 |

This ink is drawn down with a #12 Mayer bar on bond paper and steam sterilized at 250° F. for thirty minutes. The original color of this ink is white. After steam sterilization, it has turned a dark grey.

An ink of the following formulation is prepared:

| | Parts |
|---|---|
| Bakelite resin VYHH | 20 |
| MIBK | 55 |
| Zinc sulfide | 33 |
| Lead chloride | 99 |

This ink is drawn down with a #12 Mayer bar on bond paper and steam sterilized at 250° F. for thirty minutes. The original color of this ink is white. After steam sterilization it has turned a solid black.

Parts, where used in the specification and claims refers to parts by weight.

Particular embodiments of the invention have been used to illustrate the same. The invention, however, is not limited to these specific embodiments. In view of the foregoing disclosure, variations or modifications thereof will be apparent, and it is intended to include within the invention all such variations and modifications except as do not come within the scope of the appended claims.

Having thus described our invention, we claim:

1. In a steam sterilization indicating device of the type comprising a base containing a marking thereon which changes color when exposed to the conditions of steam sterilization, the improvement comprising: said marking comprising a steam permeable carrier film containing an intimate mixture of zinc sulfide and lead chloride, said zinc sulfide and lead chloride being present in amounts sufficient to provide in said carrier film at least 3 parts by weight of equal molar equivalents of zinc sulfide and lead chloride for each part by weight of said carrier.

2. A device of claim 1 wherein said device is a flexible sheet containing on one side thereof a pressure-sensitive adhesive resistant to heat flow at temperature of 215° F. and containing on the other side thereof said marking.

3. A device of claim 1 in which said carrier is vinyl film.

4. A device of claim 3 in which said carrier vinyl film is formed of a copolymer of polyvinyl chloride and polyvinyl acetate.

5. An ink adapted for forming markings which change color under the conditions of steam sterilization comprising an organic solvent, a film-forming carrier, and color change pigment consisting essentially of a mixture of zinc sulfide and lead chloride, said zinc sulfide and lead chloride being present in amounts sufficient to provide in said carrier film at least 3 parts by weight of equal molar equivalents of zinc sulfide and lead chloride for each part by weight of said carrier.

6. An ink of claim 5 in which said carrier is a vinyl film forming resin.

7. An ink of claim 6 in which said film forming resin is a copolymer of polyvinyl chloride and polyvinyl acetate.

References Cited
UNITED STATES PATENTS

| | | | |
|---|---|---|---|
| 2,121,022 | 6/1938 | Cornwell | 101—426 |
| 2,889,799 | 6/1959 | Korpman | 23—253 |
| 3,080,251 | 3/1963 | Claus | 101—426 |

OTHER REFERENCES

Rothschild: "The Coactivator Emission of ZnS and (Zn, Cd) S Phosphors, Chem. Abs., vol. 58, p. 3997, March 1963.

Sneed et al.: "Comprehensive Inorganic Chemistry," vol. 2, pp. 61–62, Van Nostrand, Princeton, N.J., 1953.

MORRIS O. WOLK, *Primary Examiner.*

L. MEI, R. M. REESE, *Assistant Examiners.*

UNITED STATES PATENT OFFICE
CERTIFICATE OF CORRECTION

Patent No. 3,360,337                          December 26, 1967

Martin I. Edenbaum et al.

It is hereby certified that error appears in the above numbered patent requiring correction and that the said Letters Patent should read as corrected below.

Column 4, line 46, strike out "As the color change is from white to a deep black the" and insert instead -- As the color change indicator of the present invention --.

Signed and sealed this 28th day of January 1969.

(SEAL)
Attest:

Edward M. Fletcher, Jr.                          EDWARD J. BRENNER
Attesting Officer                                   Commissioner of Patents